United States Patent
Brazell et al.

(10) Patent No.: US 6,360,797 B1
(45) Date of Patent: Mar. 26, 2002

(54) POWER TOOL AND PORTABLE SUPPORT ASSEMBLY

(75) Inventors: Kenneth M. Brazell, Phoenix, AZ (US); M. Edward Lawing, San Diego, CA (US); Jeffrey M. Dils, Chandler, AZ (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/473,645

(22) Filed: Dec. 28, 1999

(51) Int. Cl.$^7$ .......................... B25H 1/00; B23D 19/00
(52) U.S. Cl. .................... 144/286.1; 83/574; 83/477.2; 144/286.5; 248/129
(58) Field of Search ................................ 83/574, 471.3, 83/477.2, 486.1; 144/1.1, 286.1, 286.5; 248/129, 646, 647, 676, 678; 28/47.19

(56) References Cited

U.S. PATENT DOCUMENTS

| | | |
|---|---|---|
| 1,807,916 A | 6/1931 | Jones |
| 1,978,650 A | 10/1934 | Shannon |
| 2,482,012 A | 9/1949 | Marks |
| 4,181,057 A | 1/1980 | Bassett |
| 4,269,096 A | 5/1981 | Boone |
| 4,377,099 A | 3/1983 | Howe |
| 4,860,807 A | 8/1989 | Vacchiano |
| 4,969,496 A | 11/1990 | Romans |
| 5,067,535 A | 11/1991 | Wolff |
| 5,437,319 A | * 8/1995 | Garuglieri ................ 144/286.1 |
| 5,479,840 A | 1/1996 | Hilliard et al. |
| 5,676,124 A | 10/1997 | Lee |
| 5,778,953 A | 7/1998 | Braddock |
| 5,857,507 A | 1/1999 | Puzio et al. |
| 6,203,053 B1 | * 3/2001 | Sohrt et al. ................ 248/129 |

* cited by examiner

Primary Examiner—W. Donald Bray
(74) Attorney, Agent, or Firm—Brooks & Kushman P.C.

(57) ABSTRACT

A motorized power tool and several support structures are defined. A basic embodiment includes a unibody base having base upper and base lower ends and sidewalls collectively forming an internal cavity. Atop the base upper end is disposed a table having a work support surface. A motor driven implement such as a saw blade or a sanding drum is supported so that it is adjustable and extends above the table. Wheels are disposed at the base lower end of one end of the base and an extendable handle at the other. The handle can be used to tilt the base so that all the weight is centered above the wheels and then to move the power tool. A fence is also slidably mounted on the table to adjustably position a workpiece relative to the saw blade. Support assemblies include standard-sized lumber, fitted into pockets in the base, joined pairs of legs that fold upward into the base, and an assembly having a pair of legs, between which the base can be pivoted for transport, and another pair of legs that can also be pivoted therebetween for the same purpose.

26 Claims, 7 Drawing Sheets

POWER TOOL AND PORTABLE SUPPORT ASSEMBLY

TECHNICAL FIELD

The present invention relates generally to mounted motorized power tools and more particularly to motorized power tools having support apparatuses that facilitate transport and set-up.

BACKGROUND ART

Known in the art are workpiece cutting and abrading machines that include a support upon which is mounted a table having a plane working surface for supporting a workpiece. Typical of the workpiece cutting machines is, for example, a table saw having a support upon which is mounted a generally planar table having a slot disposed therein. An electric motor is mounted beneath the table, and a positionable circular saw blade is rotatably mounted so that it extends upwardly through the slot to cut the workpiece when the blade is rotated by the motor. Another example is a drum or disk sander mounted on a similar support and also being driven by a motor.

The support commonly has sidewalls extending upwardly from an open base to the table. The table supports a workpiece and cooperates with the sidewalls to isolate the motor and moving parts from sawdust, clothing and fingers. Commonly, controls that position the motor, the blade, or the sanding drum or disk extend through one or more sidewalls. Mounting tabs and/or flanges for securing the machine to a stand or work bench are commonly formed on the base or on the sidewalls proximate their lower edges.

DISCLOSURE OF INVENTION

An object of the present invention is to provide an improved motorized power tool and support assembly that is easy to transport and easy to set up at a work site.

A feature of an embodiment of the present invention is that the support assembly allows the power tool and support assembly to be tilted to generally center their combined weight on a wheel assembly to allow the power tool and support assembly to be moved with relative ease.

A feature of another embodiment is that the support apparatus uses legs readily fabricated from standard-sized scrap lumber.

A feature of yet another embodiment is that the support apparatus uses permanently attached legs that are retractable.

An advantage of the another embodiment is that legs may be easily and quickly made at a work site and may be readily formed to accommodate height requirements even though the local terrain is inclined or stepped.

Another advantage of the another embodiment is that the fabricated legs can be easily removed to facilitate storing and transporting the power tool.

An advantage of the yet another embodiment is that the retractable legs can be easily retracted to facilitate storing and transporting the power tool and easily extended to facilitate setting up the power tool.

In realizing the aforementioned and other objects, features and advantages, the support assembly includes a base that has a plurality of generally vertically extending sidewalls. It is formed in one piece of a molded composite material. The base also has a base upper end and a base lower end, and an interior cavity is defined between the sidewalls ad the base upper and lower ends. The base also has opposing first and second ends.

A table is disposed atop the base upper end. The table has a work support surface for supporting workpieces. A wheel assembly is disposed on the base. It includes a mounting member upon which at least one wheel, which is rotatable about a wheel rotational axis A, is mounted. The at least one wheel is disposed proximate the base lower end at one end of the base. An adjustable fence is slidably and rotatably mounted on the table for positioning a workpiece relative to the driven implement.

In one embodiment of the present invention, the base has disposed therein at least three channels, or pockets. The pockets are sized to receive telescopically a length of standard-sized lumber that, when installed, forms one of a set of legs for stably supporting the base at working height upon a floor surface. The pockets are oriented in a generally vertical direction but are inclined from the vertical sufficiently to impose a stability-inducing splayed disposition of the legs. A fastening device is provided to releasably retain the length of the leg residing within each channel.

The driven element is, in one preferred embodiment, a motor-driven circular saw blade. In another preferred embodiment, it is a motor-driven sanding drum.

BRIEF DESCRIPTION OF DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
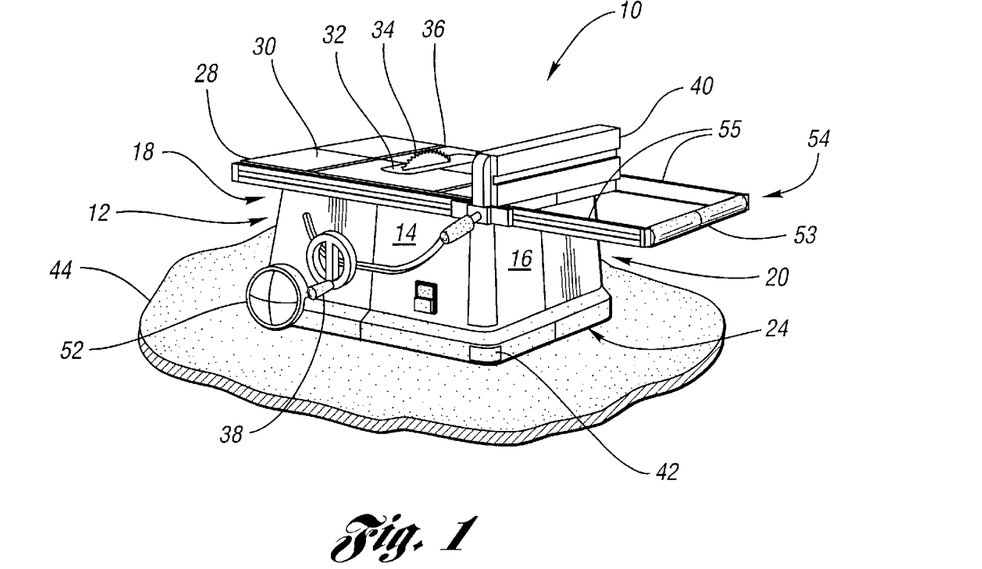
FIG. 1 is a perspective view of a representative power tool incorporating a circular saw blade and various other features according to the present invention, the power tool being shown mounted on a work table.
Figure 2:
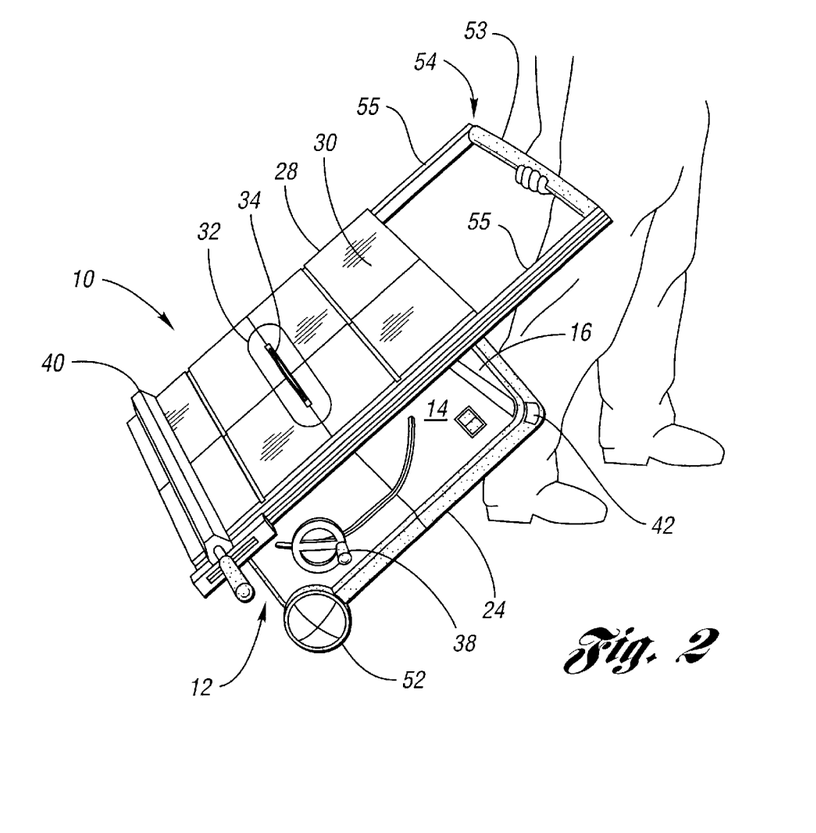
FIG. 2 is a view of the power tool shown by FIG. 1, independent of the work table and being pulled along on its own wheels.

FIGS. 1 and 2 show a first preferred embodiment of the present invention. Shown is a support assembly, generally indicated by reference numeral 10. It includes a base, generally indicated by reference numeral 12, having a plurality of sidewalls. Preferably, a horizontal cross-section of the base 12 has a generally rectangular configuration. The base 12 is formed, in one piece, of a molded composition material. A pair of opposing sidewalls 14 form a front and a rear of the base 12; and another pair of sidewalls 16 form a first end, generally indicated by reference numeral 18, and a second end, generally indicated by reference numeral 20, of the base 12. The upper and lower extremities of the sidewalls respectively form a base upper end, generally indicated by reference numeral 22 (FIG. 8), and a base lower end, generally indicated by the reference numeral 24. An internal cavity, generally indicated by reference numeral 26 (FIG. 8), is defined between the sidewalls 14 and 16 and the upper and lower base ends 22 and 24. (Note that the views of two sidewalls 14 and 16 are obstructed, but that these sidewalls are of generally similar configuration to the other two respective sidewalls 14 and 16.)

An essentially planar table 28 having a work support surface 30 for supporting a workpiece (not shown) is mounted atop the base upper end 22. Flushly fitted into the work support surface 30 is a throat plate 32 having a blade slot 34 extending therethrough. A driven implement, or circular saw blade, 36 is rotatably supported by a blade-height and tilt mechanism and is driven by a motor. (The mechanism and motor are mounted within the interior cavity 26 and are not shown.) A manually operable control member 38 extends through the front sidewall 14 of the base 12 for positioning the circular saw blade 36.

Shown mounted on the table 28 is an adjustable fence 40. The fence 40 is slidable along the work support surface 30 of the table 28 to position and guide workpieces relative to the circular saw blade 36. At various positions along the base lower end 24 are flanges, a representative one of which is the flange 42, for receiving fastening members, such as screws, (not shown) to secure the support assembly 10 to a workbench 44, as shown in FIG. 1.

A wheel assembly, generally indicated by reference numeral 46 (FIG. 7) is disposed on the base 12. It includes a mounting member 50 upon which at least one, and preferably two, wheels 52, which are rotatable about a wheel rotational axis A, are mounted. The wheels 52 are disposed proximate the base lower end 24 at one end of the base 12. A handle assembly, generally indicated by the reference numeral 54, is mounted on the table 28 at an end opposing that proximate the wheel 52. The handle assembly 54 extends from the base 12 and retracts. The handle assembly 54 may include one arm with a handle at its distal end, or it may include a pair of arms.

When extended, and when the support assembly 10 is not mounted on a workbench 44, the handle 54 facilitates manually tilting the support assembly 10 to center its weight over the rotational axis A of the wheel 52, as shown in FIG. 2. This facilitates manually moving the support assembly 10. The handle 54 may be pivotally mounted on the base 12 so that it can be swung into operating position; or, as shown, it may be slidably mounted so that it can be slidablly extended or retracted. As an option, a plate (not shown) may also be supported within the structure of the handle 54 to provide an additional support surface.

Figure 3:
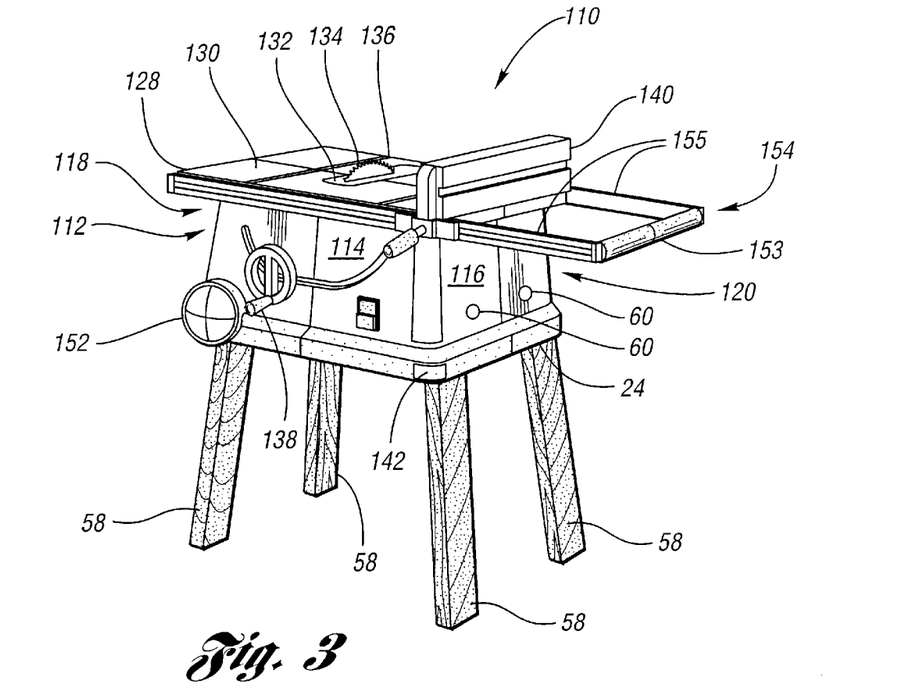
FIG. 3 is a view of the power tool shown by FIG. 1, independent of the work table and incorporating supporting legs.
Figure 7:
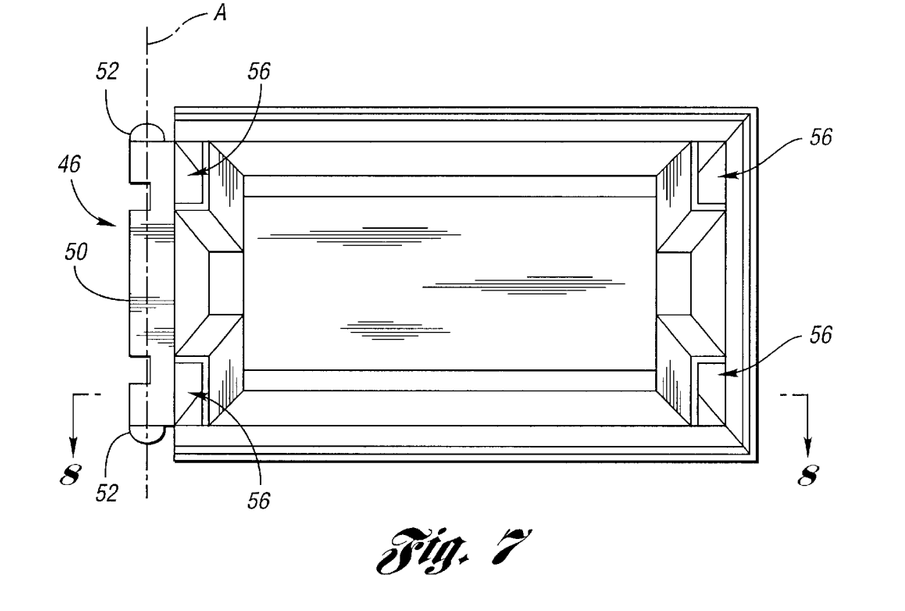
FIG. 7 is a view from beneath the base shown by FIGS. 3 and 6.
Figure 8:
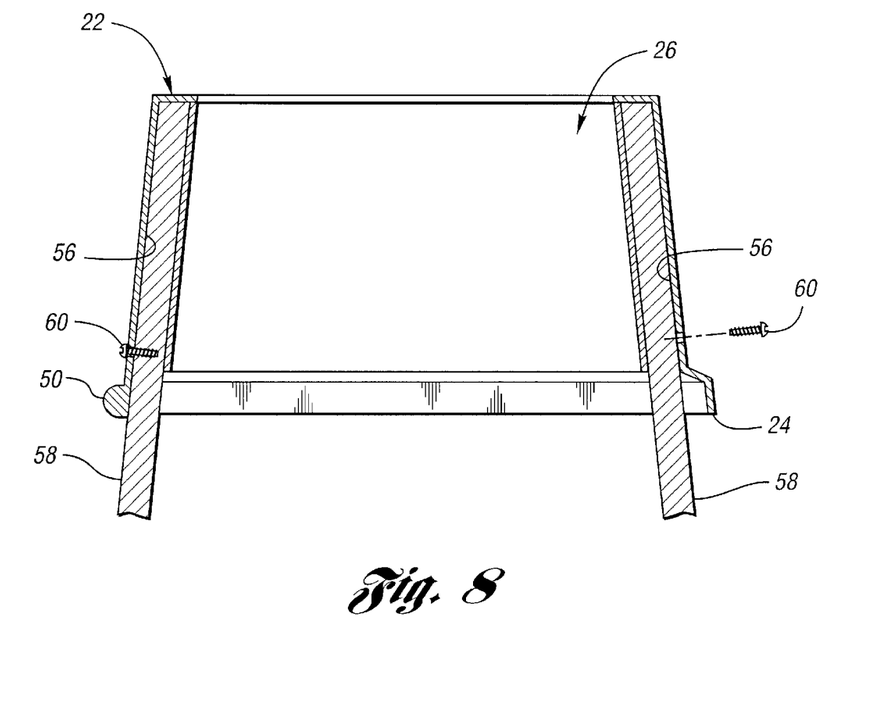
FIG. 8 is a partial sectional view of the base taken generally along line VIII—VIII of FIG. 7.

The support assembly 110 shown in FIG. 3 is a second preferred embodiment of the invention. It is basically the same as that shown in the first embodiment shown in FIGS. 1 and 2. As shown in FIGS. 7 and 8, however, it further includes at least three, and preferably four, spaced apart, generally vertically extending channels 56 (FIGS. 7 and 8). The channels are sized to receive telescopically therewithin lengths of standard-sized lumber, such as a common two-by-fours. These may be cut to length on a work site to provide support legs 58 of any desired working height. If the surface upon which the support assembly 10 is uneven or even stepped, it is a simple matter to cut legs 58 to a compensating length.

Figure 9:
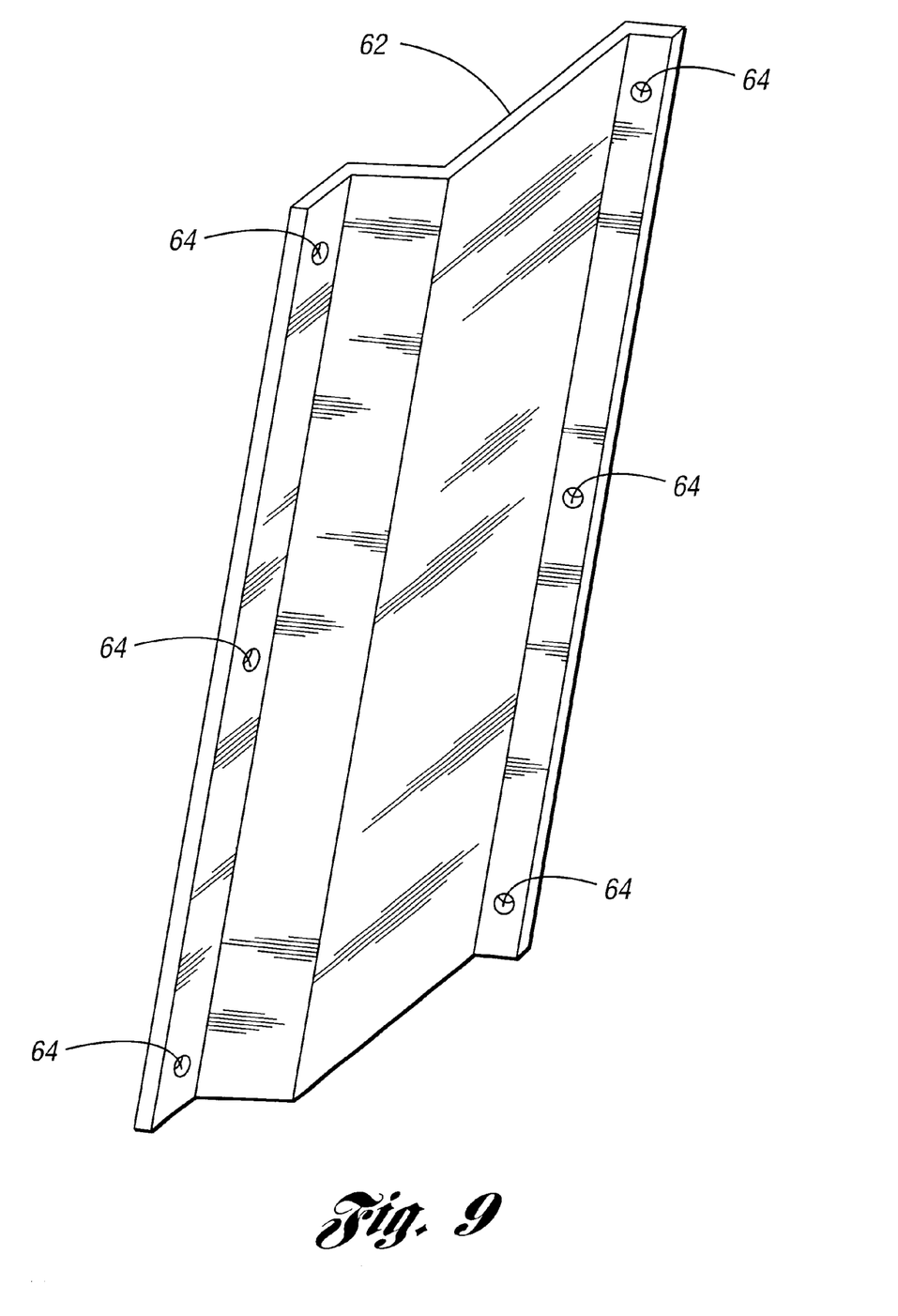
FIG. 9 is a perspective view of a representative optional feature of the base.

The channels 56 are preferably inclined from the vertical sufficiently to splay the legs 58. As a result, the legs 58 provide a wider, more stable footprint. Shown in FIG. 3 are fastening devices, such as screws, 60 to retain the legs 58 within the channels 56. The channels 56 shown in FIGS. 7 and 8 are intended to be representative of workable channels, but it should be understood that channels having different configurations could be used. Moreover, channels 56 as shown in FIG. 7 may be molded in situ when the base 12 is formed; or channel members 62 defining the channels 56 may be supplied as an option. An example of a representative optional channel member 62 is shown in FIG. 9. It contains apertures 64 therein for inserting fastening devices such as screws (not shown) with which to fasten the channel member 62 in a corner of the base 12 to form, in cooperation therewith, a channel 56.

Figure 4:
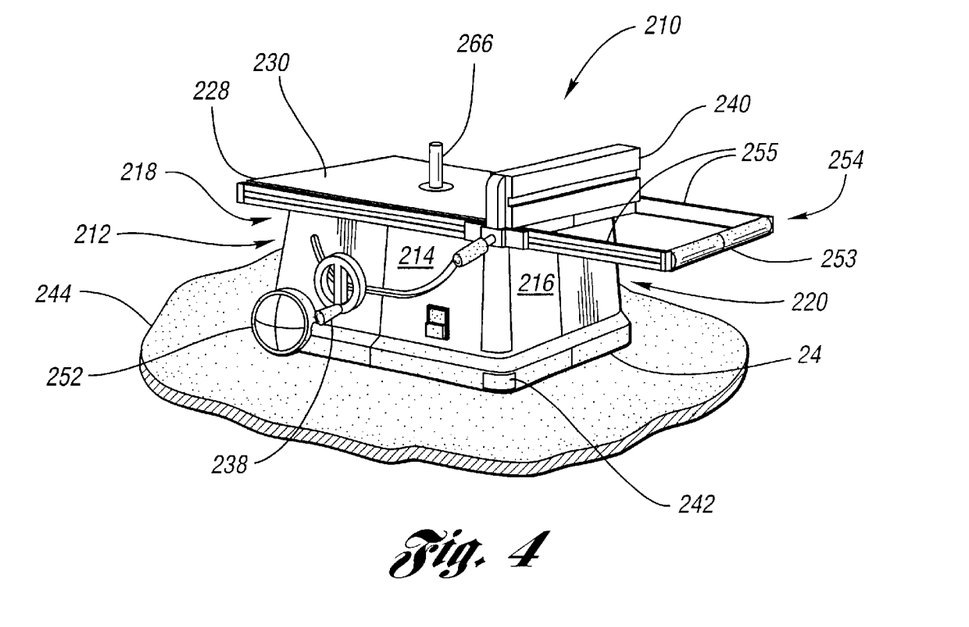
FIG. 4 is a view of the power tool shown by FIG. 1 but incorporating a sanding drum.
Figure 5:
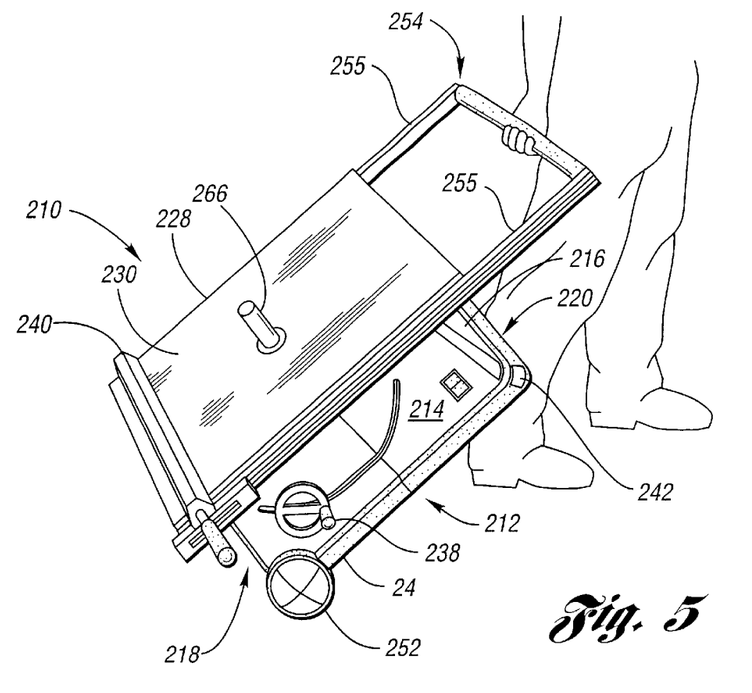
FIG. 5 is a view of the power tool shown by FIG. 4, independent of the work table and being pulled along on its own wheels.
Figure 6:
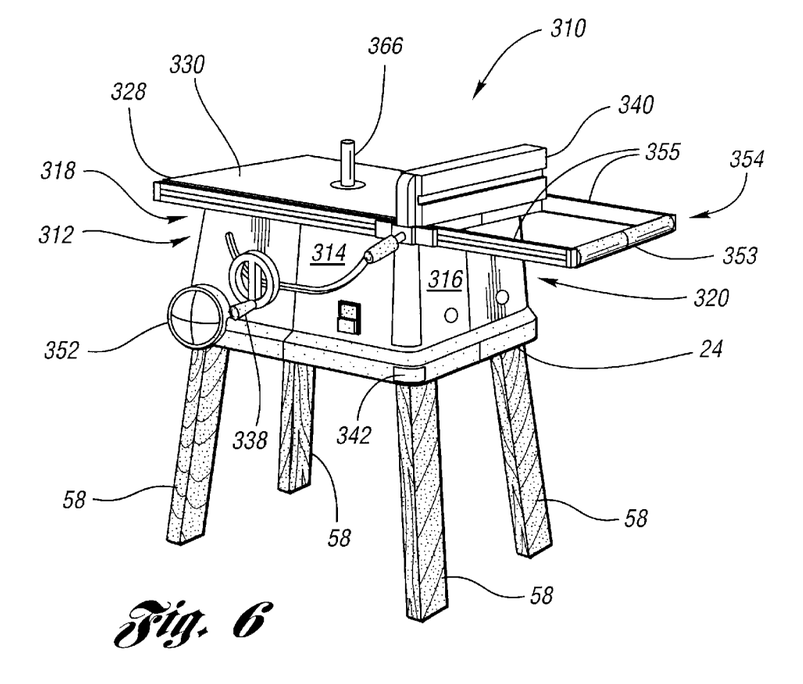
FIG. 6 is a view of the power tool shown by FIG. 4, independent of the work table and incorporating supporting legs.

FIGS. 4 and 5 show a third preferred embodiment of the present invention. This embodiment 210 is basically the same as that shown in FIGS. 1 and 2 except that the driven implement is a sanding drum 266 rather than a circular saw blade 36 A fourth preferred embodiment 310 is shown in FIG. 6, and it shares the same comparison with the embodiment shown in FIG. 3; that is, the driven implement is a sanding drum 266 rather than a circular saw blade 36.

Figure 10:
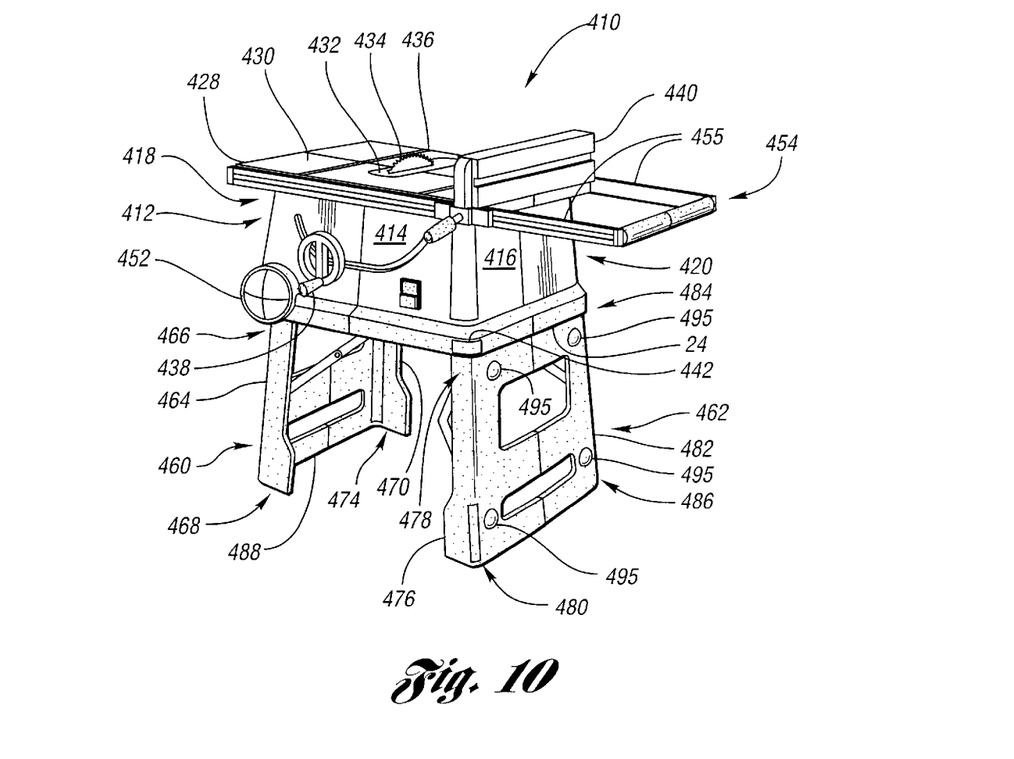
FIG. 10 is a view of the power tool shown by FIG. 1, independent of the work table and incorporating retractable supporting legs.

FIG. 10 shows a fifth preferred embodiment of the present invention. This embodiment 410 is similar to that shown in FIG. 2 with the addition of foldable legs. A first pair of foldable legs is generally indicated by reference numeral 460; and a second pair of foldable legs is generally indicated by reference numeral 462. The first pair of foldable legs 460 includes a forward leg 464 having an upper end, generally indicated by reference numeral 466, and a lower end, generally indicated by reference numeral 468, and includes a rear leg 470 having an upper end (472, obscured) and a lower end, generally indicated by reference numeral 474. The upper end 466 and 472 of each leg is pivotally connected to the base 412 at the base lower end 24 respectively proximate a forward and a rear corner of the first end 418 of the base 412.

The second pair of foldable legs 462 includes a forward leg 476 having an upper end, generally indicated by reference numeral 478, and a lower end, generally indicated by reference numeral 480, and includes a rear leg 482, having an upper end, generally indicated by reference numeral 484, and a lower end, generally indicated by reference numeral 486. The upper end 478 and 484 of each leg is pivotally connected to the base 412 at the base lower end 24 respectively proximate a forward and a rear corner of the second end 420 of the base 412. A web 488 extends between the forward leg 464 and the rear leg 470 of the first pair of foldable legs 460 and a similar web 490 extends between the forward leg 476 and the rear leg 482 of the second pair of foldable legs 462 to provide strength and stability.

Figures 10A, 10B:
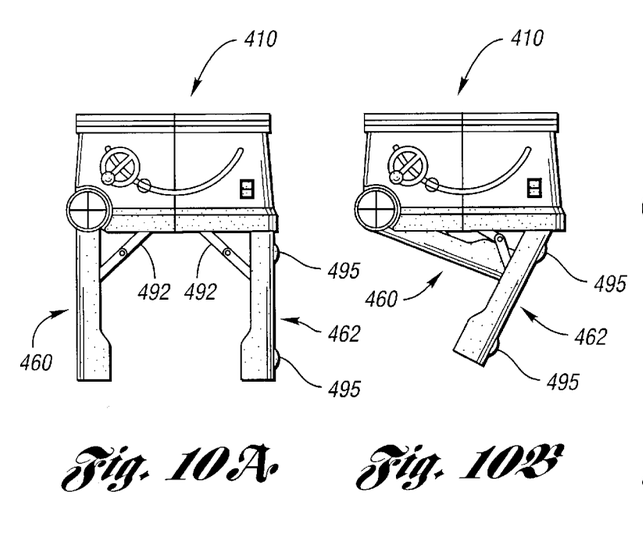
FIGS. 10A, 10B AND 10C are views of the power tool shown by FIG. 10, respectively showing the retractable supporting legs completely extended, partially retracted and fully retracted.
Figure 10C:
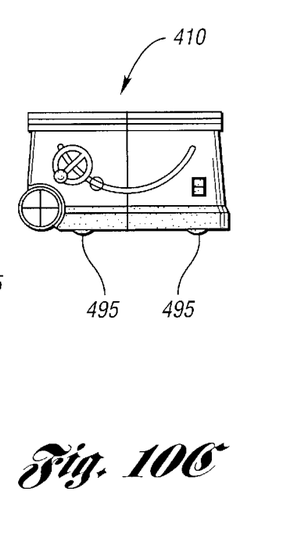

FIG. 10A shows the foldable legs in their extended position. A fastening member, typically an overcenter linkage, 492 is pivotally connected between a central portion of each leg and the base lower end 24 to prevent the leg from being accidently retracted. To retract the legs, the overcenter linkages 492 connected to the first pair of foldable legs 460 are disengaged; and the legs are folded upward as shown in FIG. 10B. Next, the overcenter linkages 492 connected to the second pair of foldable legs 462 are disengaged; and the legs are folded upward as shown in FIGS. 10B and 10C. The second pair of legs 462 has pads 495 attached to provide a geometrically balanced footing for the support assembly, as shown in FIG. 10C.

Figure 11:
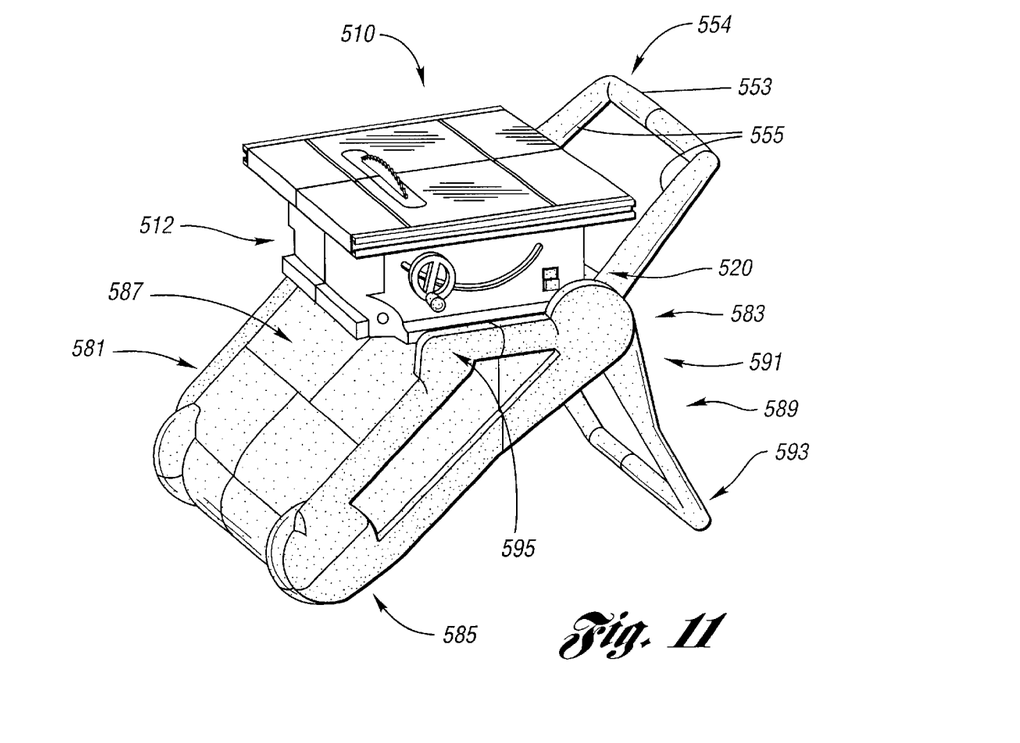
FIG. 11 is a perspective view of the power tool shown by FIG. 1, independent of the work table and also incorporating retractable supporting legs.
Figure 12:
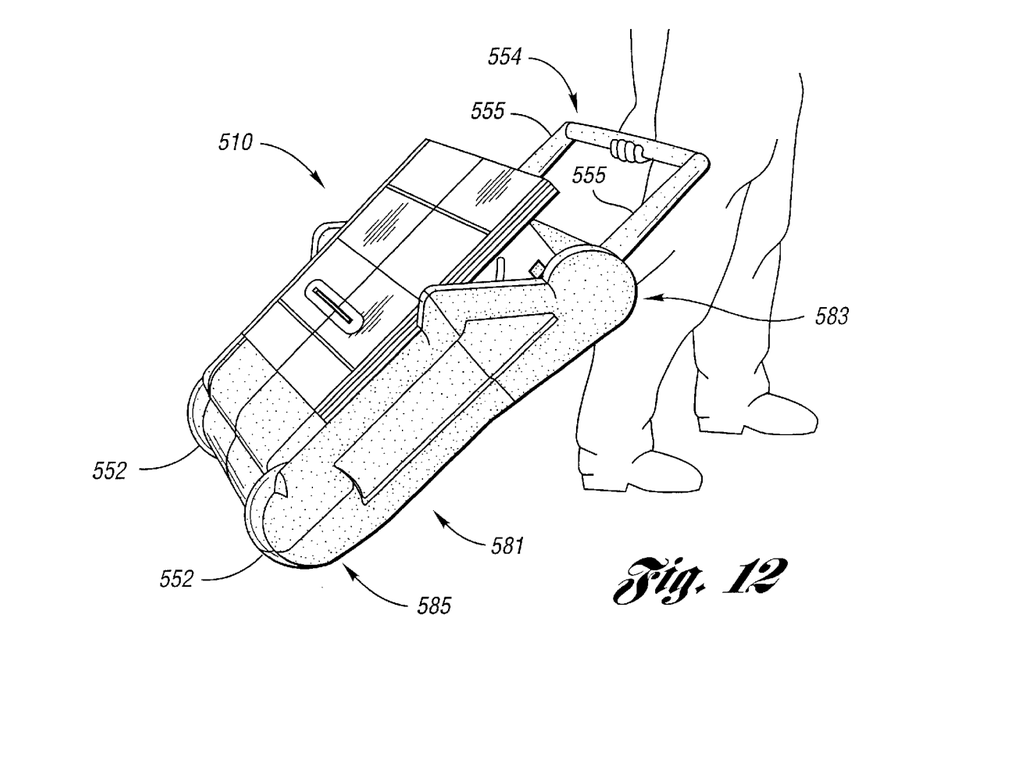
FIG. 12 is a view of the power tool shown by FIG. 11, having its legs retracted and being pulled along on its own wheels.

A sixth preferred embodiment of the present invention is shown by FIGS. 11 and 12. This embodiment 510 is similar to that shown in FIG. 2, but the mounting member 50 of the wheel assembly 46 is mounted proximate the base lower end 24 of the second end 20 of the base 512. The wheel assembly 46 (FIG. 7) additionally includes a first pair of legs, generally indicated by reference numeral 581, each having an upper end, generally indicated by reference numeral 583, and a lower end, generally indicated by reference numeral 585. The upper ends 583 are pivotally attached to the mounting member 50 (FIGS. and 8). A wheel 552 is rotatably attached to the lower end 585 of each of the first pair of legs 581, or a roller, therebetween. The first pair of legs 581 are rigidly joined together and spaced to define a cavity, generally indicated by reference numeral 587, therebetween. The first pair of legs 581 has a support, generally indicated by reference numeral 595, that maintains the base 512 in a horizontal orientation when the present invention is to be operated, as shown in FIG. 11; but the base 512 can be released and pivoted about its second end 520 so that it resides within the cavity 587, as shown in FIG. 12.

A second pair of legs, generally indicated by reference numeral 589, each of the pair being joined to the other in spaced apart relationship and having an upper end, generally indicated by reference numeral 591, and a lower end, generally indicated by reference numeral 593, is also pivotally attached to the mounting member 50 (FIGS. 7 and 8) at the upper ends of each of its legs 589. As shown in FIG. 11, the lower end of each of the second pair of legs 589 forms a foot to support the base 512 when the present invention is to be operated. As shown in FIG. 12, the second pair of legs 589 can be swung upward and are configured so that they reside between the legs of the first pair of legs 581. As illustrated, when the base 512 is residing within the cavity 587 and the second pair of legs 589 has been rotated between the legs of the first pair 581, the whole support assembly can be easily moved from one location to another.

While embodiments of the invention have been illustrated and described, it is not intended that these embodiments illustrate and describe all possible forms of the invention. Rather, the words used in the specification are words of description rather than of limitation; and it should be understood that various changes may be made without departing from the spirit and scope of the invention.

What is claimed is:

1. A support assembly for transporting a motor driven woodworking implement, the support assembly comprising:
    a base having a plurality of generally vertically extending sidewalls and having a base upper end and a base lower end, an interior cavity being defined between the sidewalls and the base upper and lower ends, the base also having opposing laterally spaced apart first and second ends;
    a table having a work support surface and being disposed atop the base upper end;
    a wheel assembly disposed on the base and including at least one wheel rotatable about a wheel axis, the wheel being disposed proximate the base lower end at one of the first and second ends of the base; and
    a handle assembly mounted on the base at the other of the first and second ends opposing that end proximate the wheel, the handle assembly facilitating manually tilting the support assembly to raise the base lower end off a horizontal surface upon which the base is placed, thereby facilitating manual movement of the support assembly from one location to another.

2. The support assembly defined by claim 1, wherein the base is formed, in one piece, of a molded composite material.

3. The support assembly defined by claim 2, further comprising an adjustable fence to position a workpiece relative to the table work support surface.

4. The support assembly defined by claim 3, wherein the wheel assembly includes a mounting member upon which the at least one wheel is rotatably mounted.

5. The support assembly defined by claim 4, further comprising a motor driven circular saw mechanism having a rotary saw blade which projects through a slot in the table work support surface.

6. The support assembly defined by claim 4, further comprising a motor driven sanding drum mechanism having a rotary drum which projects upwardly through an aperture in the table work support surface.

7. The support assembly defined by claim 5, wherein the base further comprises at least three spaced apart, generally vertically extending channels, each sized to receive telescopically a length of standard-sized lumber that, when installed, forms one of a set of legs for stably supporting the base at working height upon a floor surface.

8. The support assembly defined by claim 7, further comprising a plurality of fasteners for releasably retaining the legs residing within each channel.

9. The support assembly defined by claim 8, wherein the channels are inclined from the vertical to impose a stability-inducing splayed disposition of the legs.

10. The support assembly defined by claim 6, wherein the base further comprises at least three spaced apart, generally vertically extending channels, each sized to receive telescopically a length of standard-sized lumber that, when installed, forms one of a set of legs for stably supporting the base at working height upon a floor surface.

11. The support assembly defined by claim 10, further comprising a plurality of fasteners for releasably retain the legs residing within each channel.

12. The support assembly defined by claim 11, wherein the channels are inclined from the vertical to impose a stability-inducing splayed disposition of the legs.

13. The support assembly defined by claim 1, further comprising:
    a first pair of foldable legs including a forward leg having an upper end and a lower end and a rear leg having an upper end and a lower end, the upper ends of the forward and rear legs being pivotally connected to the base lower end proximate opposing corners of the first end of the base, and the lower ends of the forward and rear legs depending to contact a floor surface; and
    a second pair of foldable legs including a forward leg having an upper end and a lower end and a rear leg having an upper end and a lower end, the upper ends of the forward and rear legs being pivotally connected to the base lower end proximate opposing corners of the second end of the base, and the lower ends of the forward and rear legs depending to contact the floor surface;
    wherein the first pair of foldable legs being upwardly swingable to a position within the base, and the second pair of foldable legs also being upwardly swingable to a position within the base, thereby alternatively facilitating the use of the assembly on a raised table top and the tilting the assembly to raise the base lower end off a horizontal surface upon which the base is placed, thereby facilitating manual movement of the support assembly from one location to another.

14. The support assembly defined by claim 13, further including a web extending between the forward leg and the rear leg of the first pair of foldable legs, and a similar web extending between the forward leg and the rear leg of the second pair of foldable legs to increase strength and stability of the paired legs.

15. The support assembly defined by claim 13, further comprising a fastening member connected between each leg and the base to prevent the leg from being accidentally retracted.

16. The support assembly defined by claim 15, wherein the fastening member is an overcenter linkage pivotally connected between a central portion of each leg and the base lower end.

17. The support assembly defined by claim 14, further comprising a plurality of pads attached to the second pair of legs to provide a geometrically balanced footing for the support assembly.

18. The support assembly defined by claim 1, further comprising:
a first support structure having opposed front and rear legs movable between a support position and a transport position, the front and rear legs including an upper end connected to the second end of the base, a lower end including at least one wheel rotatably mounted on the front and rear legs, and an opening defined therebetween, wherein the base is retractable about and received within the opening in the first support structure in the transport position; and
a second support structure having opposed front and rear legs movable between a support position and a transport position, the front and rear legs of the second support structure including an upper end connected to the second end of the base and a lower end terminating in a leg stand portion cooperating with a horizontal floor to support the power tool, wherein the second support structure is retractable toward, and is stowed within, the opening defined in the first support structure in the transport position.

19. The support assembly defined by claim 1, wherein the handle assembly further comprises at least one arm having a first end mounted on the table adjacent the second end of the base and a handle disposed at a second end of the at least one arm.

20. The support assembly defined by claim 19, wherein the handle assembly further comprises opposed first and second arms having first ends mounted on the table and a handle disposed between the second ends of the first and second arms.

21. The support assembly defined by claim 20, wherein the first ends of the first and second arms of the handle assembly are pivotally mounted on the table such that the handle can be moved from an operative position to an extended, transportable position.

22. The support assembly defined by claim 20, wherein the first ends of the first and second arms of the handle assembly are slidably mounted on the table such that the handle can be moved from an operative position to an extended, transportable position.

23. A table saw assembly including the support assembly of claim 1 for transporting the table saw, the table saw further comprising:

a saw assembly including a motor and a circular saw blade driven by the motor, the saw assembly being mounted within the base below the table, the table including an opening through which the blade projects;
a first support structure having opposed first and second legs movable between a support position and a transport position, the first and second legs including a first end pivotally connected to the second end of the base, a second end having the wheel assembly terminating in a leg end portion; and
a second support structure having opposed first and second legs movable between a support position and a transport position, the first and second legs including a first end pivotally connected to the second end of the base and a second end terminating in a leg end portion wherein when the first and second support structures are in transport position, the leg end portions when placed on a horizontal floor surface stably support the table saw assembly with the table top surface in a generally horizontal orientation.

24. A table saw assembly including the support assembly of claim 1 for transporting the table saw, the table saw further comprising:
a table mounted to the base adjacent the top surface;
a saw assembly including a motor and a circular saw blade driven by the motor, the saw assembly being mounted within the base below the table, the table including an opening through which the blade projects;
a first support structure having opposed front and rear legs movable between a support position and a transport position, the front and rear legs including an upper end connected to the second end of the base, a lower end supporting the wheel assembly rotatably mounted on the front and rear legs, and an opening defined therebetween, wherein the base is retractable about and received within the opening in the first support structure in the transport position; and
a second support structure having opposed front and rear legs movable between a support position and a transport position, the front and rear legs of the second support structure including an upper end connected to the second end of the base and a lower end terminating in a leg stand portion cooperating with a horizontal floor to support the power tool, wherein the second support structure is retractable toward, and is stowed within, the opening defined in the first support structure in the transport position.

25. A motorized power tool comprising:
a base having a plurality of vertically extending sidewalls which collectably define an interior cavity between the sidewalls and a base upper end and a base lower end, the base lower end providing a stable support surface for resting the base upon a planar workbench top surface, the base further defining at least three spaced apart generally vertically extending channels each sized to telescopically receive a length of standard-sized rectangular cross section lumber that, when installed, form legs for stably supporting the base at working height upon a floor surface;
a table having a work support surface disposed on the base upper end; and
a motor driven implement that is positionable relative to the work support surface.

26. The motorized power tool as defined by claim 25, wherein the channels are inclined from the vertical to impose a stability inducing splayed disposition of the legs.

* * * * *